Jan. 12, 1965
J. P. SOULE
3,165,148
AIR CONDITIONING SYSTEM
Filed July 19, 1961
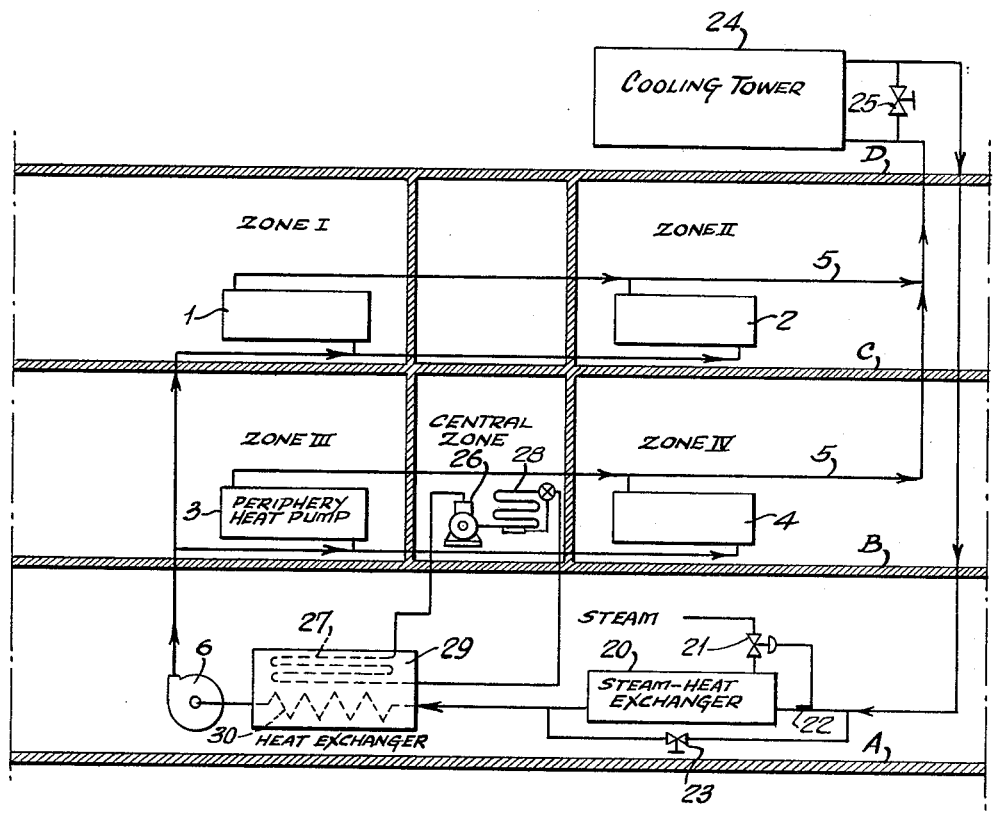
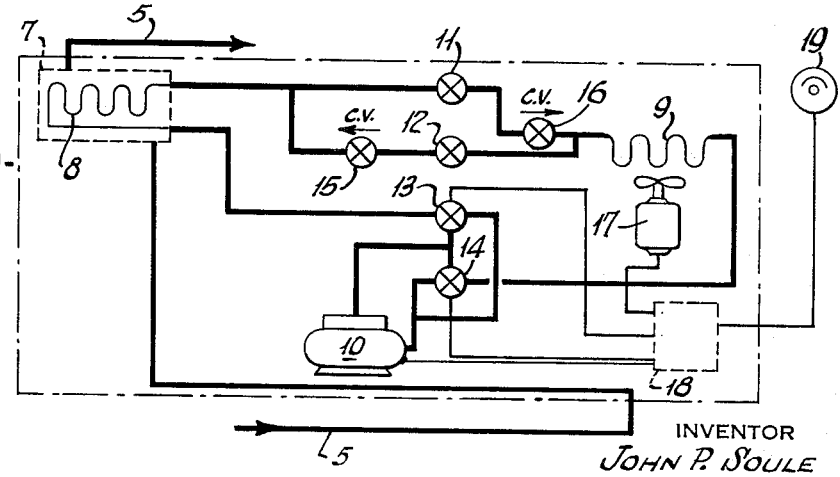
INVENTOR
JOHN P. SOULE
BY
ATTORNEY United States Patent Office 3,165,148
Patented Jan. 12, 1965

3,165,148
AIR CONDITIONING SYSTEM
John P. Soule, Birmingham, Mich., assignor to American Radiator & Standard Sanitary Corporation, New York, N.Y., a corporation of Delaware
Filed July 19, 1961, Ser. No. 125,211
3 Claims. (Cl. 165—29)

This invention relates to air conditioning, and more particularly to a heating and cooling system for a multiple zone building wherein heating in one zone may be required, while there is cooling required in another zone.

It is well known to provide an air conditioning system which is adapted to extract heat from one zone and deliver heat to another. It is also well known to provide auxiliaries for dissipating excess heat from the system and for adding heat to the system when the supply within the system is insufficient. An example of the above is found in U.S. Patent No. 2,796,740 issued to Alden I. McFarlan. Further, it is known to provide in a single line closed circuit a temperature controlled circulating fluid for heating a multiple zone building by heat transfer from the fluid to the atmosphere of building zones as exemplified by conventional steam and hot water radiatory systems.

It is an object of this invention to provide an improved heating and cooling system for a multiple zone building.

Another object is to provide a single line closed fluid circuit air conditioning system adapted to extract heat from one zone and deliver heat to another.

A further object is to provide a system as indicated above and in which there is direct transfer of heat between refrigerant and air.

A still further object is to provide an improved fast response, flexible heating and cooling system including individual room air conditioning adjustment.

A further object is to provide a single line closed circuit system requiring a minimum range of temperature of the heat transfer fluid in the system regardless of operation on heating, cooling or both.

A further object is to provide a single line closed circuit system which will operate with constant fluid flow all year round regardless of heating or cooling cycle and therefore will operate with essentially constant pump head.

A further object is to provide an improved air conditioning system effecting economy of operation during the intermediate seasons of spring and fall by way of transfer of heat from one zone to another to eliminate or minimize operation of separate heat and cooling sources.

A further object is to provide a single line circuit air conditioning system in which the heat transfer fluid temperature is substantially constant for each season and capacity variation for heating and cooling is obtained by individual zone reverse cycle refrigeration units connected in heat transfer relation to the single line closed circuit system piping.

A further object is to provide an improved air conditioning system which is inexpensive to manufacture, install and maintain in efficient operation, which has minimum space requirements and which does not require insulation on the single line closed circuit conduit.

Another object is to provide a single line closed circuit system wherein the temperature of the fluid circulated through the unit coil does not depend on the amount of cooling or heating required for each zone.

Another object is to provide a single line closed circuit wherein no mixing, throttling or sequencing valves are required in the piping at each modular unit.

Another object is to provide an improved air conditioning system adapted to conversion of presently installed single line fluid heating circuits.

In one aspect the invention comprises the provision of a single line closed circuit conduit for circulating a heat transfer fluid through the several zones of a building to be air conditioned together with separate, locally controlled, ambient temperature responsive reverse cycle refrigeration units for transferring heat between the circulating fluid and the associated zone atmosphere responsive to zone temperature. The circulating fluid, in cooperation with the reverse cycle zone refrigeration units, provides the means for transferring heat energy from one zone to another.

In a second aspect the invention comprises the above elements plus a heat source and a cooling source to add or withdraw heat from the circulating heat transfer fluid as the season temperature requires.

In a third aspect the invention comprises, in addition to combinations of the above recited elements, the addition of a heat pump unit to cool a central zone and transfer heat to the heat transfer fluid.

Further objects and advantages, and a better understanding of the invention, will be apparent to those skilled in the art by reference to the following description and to the drawing in which:

FIGURE 1 is a schematic cross-sectional elevation of a building and an air conditioning system embodying the invention; and FIGURE 2 is an enlarged schematic view of a reverse cycle refrigeration unit of which several are shown in block form in FIG. 1.

Referring now to the drawing, there is illustrated in FIG. 1 a building having a basement floor A, a first floor B, a second floor C, and a roof D. In the building are partitions defining four zones, I, II, III and IV, to be heated and cooled together with a central zone (indicated) which always requires cooling.

Also shown in FIG. 1 is an air conditioning system incorporating applicant's invention and operative to heat and cool the several zones indicated.

Basically, the system comprises a plurality of reverse refrigeration units 1–4, inclusive, located respectively in the zones I, II, III and IV. The units 1–4 inclusive are connected in a single line closed circuit conduit 5 through which a heat transfer fluid is circulated by a pump 6.

Under mild weather conditions, no further equipment or apparatus is necessary.

Referring to FIG. 2, each of the refrigeration units 1–4 comprises a heat exchanger 7, connected in the closed circuit conduit 5, through which the heat transfer fluid flows, a condenser-evaporator coil 8 in the refrigerant heat exchanger 7 to transfer heat to and from the heat transfer fluid and a second evaporator-condenser coil 9 exposed to the atmosphere of the associated zone to transfer heat to and from the air in that zone. The evaporator-condenser coils 8 and 9 are interconnected and connected to a motor driven compressor 10 through the valves 11–16 inclusive and associated piping, as indicated, for reverse cycle operation responsive to ambient temperature controls to provide heating and cooling in the associated zone as required. A motor driven fan 17 is provided to pass air over the condenser-evaporator 9, and the controls mentioned above include a selection control 18 and thermostat 19, provided to program the operation of the valves 13 and 14 and compressor 10.

In further particular, the valves 13 and 14 are two-way, two-position valves having one position for cooling operation of the refrigeration unit and one position for heating operation. In the cooling position of valve 13, high pressure gaseous refrigerant is passed from the compressor 10 to the coil 8 through valve 13 and in its heating position low pressure refrigerant gas is passed from the coil 8 to the compressor through valve 13. In the heating position of valve 14 high pressure gaseous refrigerant is passed from the compressor 10 to the coil 9 through the valve 14 and in the cooling position of valve 14 refrigerant gas is passed from coil 9 through valve 14 to the compressor 10. Valve 11 is an expansion valve for passing refrigerant from coil 8 to coil 9. Valve 12 is an expansion valve to pass refrigerant from coil 9 to coil 8. Valves 15 and 16 are check valves to keep liquid refrigerant from the discharge side of the expansion valves 11 and 12.

In operation of the refrigeration unit of FIG. 2 when the temperature in the zone in which the unit is located is such as to call for cooling of the zone, the thermostat 19 actuates the control 18 which sets the valves 13 and 14 to the cooling position, and starts the compressor. High pressure gaseous refrigerant passes from the compressor through valve 13 to coil 8 acting as a condenser, through expansion valve 11 and check valve 16 to coil 9 acting as an evaporator and the refrigerant gas passes back to the compressor 10 through the valve 14. Expansion of the refrigerant gas in the coil 9 removes heat from the air in the zone and compressed gas refrigerant passing through the coil 8 provides heat which is transferred in the heat exchanger 7 to the circulating heat transfer fluid in the single line closed circuit conduit 5. Thus, heat is taken from the zone to be cooled and passed to the circulating heat transfer fluid by which it will be transferred to another portion of the building.

When thermostat 19 is satisfied, control 18 shuts off compressor 10. When the temperature in the zone is such as to call for heating, the reverse cycle becomes effective. That is, thermostat 19 actuates the control 18 to set valves 13 and 14 in the heating position and to start the compressor. Refrigerant then passes from compressor 10 through valve 14 to coil 9, from coil 9 through expansion valve 12, and check valve 15 to coil 8 and back to the compressor through valve 13. Under this heating condition of operation, heat is removed from the heat transfer fluid by the coil 8 and transferred directly to the atmosphere of the zone by the coil 9. When thermostat 19 is satisfied, control 18 shuts off compressor 10. To avoid unnecessary activation of the reverse cycle system, the thermostat 19 is constructed to provide a "dwell" point of about 4° F. which allows about 4° F. variation in zone temperature before the compressor unit is operated. Fan 17 operates constantly when the unit is turned on.

Referring now to FIG. 1, let us assume that zones II and IV are on the sunny side of the building and the temperature is such as to require cooling while zones I and III require heating. In such case, refrigeration units 2 and 4 responsive to the temperature in the zones II and IV will operate to cool zones II and IV, the heat taken from the zones being transferred to the circulating heat transfer fluid in the conduit 5 by which it is transferred to zones I and III which are in the single line closed circuit conduit 5. The refrigeration units 1 and 3 responsive to the demand for heating in zones I and III operate to take heat from the heat transfer fluid and dispense the heat to the zones I and III.

Thus, for intermediate seasons, it is possible to provide heating and cooling air conditioning for the several zones having different heating and cooling demands without need for separate sources for adding or withdrawing heat from the circulating heat transfer fluid.

For season or climatic conditions or perhaps during the night when the heat obtained from the heat transfer fluid is not sufficient to provide the required heating, applicant provides a suitable heat source, as for example, the steam heat exchanger 20 which is connected in the single line closed circuit conduit 5. The heat source 20 is supplied with steam source indicated through a valve 21 operable in response to a thermostat 22 arranged to respond when the temperature of the heat transfer fluid drops to a predetermined point. A bypass valve 23 may be added to bypass the heat source 20 in mild seasons.

For the summer, when the normal or major load is cooling, there is provided a suitable heat rejection or cooling source, as for example, a cooling tower 24 connected to the conduit 5 to remove excess heat from the heat transfer fluid when the temperature of the fluid rises to a predetermined point. The cooling tower is provided with a bypass valve 25 for eliminating the cooling tower from the system in the winter season.

As a further modification of applicant's heating and cooling system, there is provided for buildings having a central zone which always requires cooling a heat pump for removing heat from the central zone and transferring the heat to the circulating heat transfer fluid. Thus, in FIG. 1, there is shown a compressor 26 connected in closed circuit with a condenser coil 27 and an evaporator coil 28. The coil 28 is located in the central zone to remove heat therefrom. The coil 27 is part of a heat exchanger 29 which has a heat exchanger coil 30 connected in series with the conduit 5 to pass therethrough the heat transfer fluid. Thus, applicant's system is sufficiently flexible to utilize heat from a central zone requiring cooling by transferring such heat to other zones of the building.

One advantage of applicant's invention is the economy of installation and material and the flexibility of installation. In this respect it is to be noted that applicant's air conditioning system requires only a single line closed circuit conduit. No means are required or provided to closely control the temperature of the heat transfer fluid. This is possible because the fluid temperature range required is relatively constant for any season and because variation in capacity for heating and cooling the zones is obtained from the reverse cycle refrigeration unit or units in each zone rather than by adjusting the temperature of the circulating heat transfer fluid. Means are provided to maintain the circulating fluid temperature within the limits of its desired range. Also for the same reasons it is not necessary to vary the circulation rate of the heat transfer fluid.

Compared to conventional systems where the temperature of circulating cool and hot water vary from say 40° to 180° F., in applicant's system the range of circulating fluid is from about 65° to 85° F. This provides a considerable saving in heat loss or heat gain in the line as the fluid temperature in piping conduit is in the same range as the temperature of the space being heated or cooled and no heat insulation is required on the piping conduit. Also, there is no need to provide condensation proof insulation for the closed circuit conduit as its temperature is above the dew point of the space to be heated or cooled.

In applicant's system, by use of the reverse cycle refrigeration units, there is more rapid response to local temperature change demands with a direct refrigerant to air heat transfer.

Economy of operation is provided by way of the transfer of heat from one zone to another to avoid in mild weather seasons and to minimize in cold or hot weather or intermediate seasons, the operation of separate heat or cooling sources.

A further advantage of applicant's air conditioning system is its adaptability to the conversion of presently installed single line heating circuits and the adaptability to progressive installation of heating and cooling units.

It is to be understood that this invention is not to be limited to the specific constructions and arrangements shown and described, except only insofar as the claims may be so limited, as it will be apparent to those skilled in the art that changes may be made without departing from the principles of the invention.

What is claimed is:

1. In a building, an air conditioning system for heating and cooling a plurality of peripheral zones and a central zone within said building, comprising a conduit for circulating a heat transfer fluid to said peripheral zones, reverse cycle refrigeration units in said peripheral zones having a first heat exchange element arranged in heat transfer relation with the circulating fluid in said conduit and a second heat exchange element arranged in heat transfer relation with the air in its associated zone, said first and second heat exchange elements being supplied with a common refrigerant and being operatively interconnected such that said elements may operate respectively as a refrigerant evaporator and as a refrigerant condenser or respectively as a refrigerant condenser and refrigerant evaporator, said units being operable on one cycle to transfer heat from said heat transfer fluid to the air in its associated zone and on the other cycle of operation to transfer heat from the air to said heat transfer fluid, heat source means connected to said conduit to add heat to the heat transfer fluid when required, a cooling unit to cool the heat transfer fluid when required, and a second cooling unit providing a heat transfer relation between said conduit and said central zone of said building, said central zone being within a portion of the building where there is substantially no heat transmission through the walls to lose or gain heat such that such central zone only requires cooling due to internal heat gains within said central zone, said second cooling unit comprising refrigeration apparatus designed to operate exclusively as a cooling unit to transfer heat from said central zone to said heat transfer fluid.

2. The combination set forth in claim 1 wherein said second cooling unit comprises an evaporator coil operating exclusively as an evaporator located in said central zone to cool the latter and a condenser coil operating exclusively as a condenser interconnected therewith, said condenser coil being arranged in heat transfer relation with the heat transfer fluid of said conduit to transfer heat from the air in the central zone to said heat transfer fluid.

3. In a building, an air conditioning system for heating and cooling a plurality of peripheral zones and a central zone within said building, comprising a conduit for circulating a heat transfer fluid to said peripheral zones, reverse cycle refrigeration units located in said peripheral zones, said units including heat exchange element means in heat exchange relation to said conduit to provide on one cycle of operation a transfer of heat from said heat transfer fluid to the air of its associated zone and on the reverse cycle a transfer of heat from the air in the respective zone to the heat transfer fluid, means to maintain the temperature of the heat transfer fluid substantially in the range of about 65° F. to 85° F. for all seasons of the year and substantially constant for any particular season such that the heat loss from, and vapor accumulation on, said conduit is held at a minimum, the last said means comprising refrigeration apparatus designed to operate exclusively as a cooling unit to transfer heat from said central zone of said building which only requires cooling to said heat transfer fluid, control means including a thermostat to program the operation of each individual refrigeration unit, and pump means to circulate the heat transfer fluid at a substantially constant rate for all seasons of operation thereby maintaining at the heat exchange element means of each reverse cycle refrigeration unit, a constant circulating fluid pressure head and a constant fluid pressure drop through each reverse cycle refrigeration unit.

References Cited in the file of this patent
UNITED STATES PATENTS

| | | |
|---|---|---|
| 2,204,394 | Bailey | June 11, 1940 |
| 2,293,482 | Ambrose | Aug. 18, 1942 |
| 2,414,339 | Skaggs et al. | June 14, 1947 |
| 2,513,373 | Sporn et al. | July 4, 1950 |
| 2,715,514 | Stair | Aug. 16, 1955 |
| 2,756,970 | Hermann | July 31, 1956 |
| 2,796,740 | McFarlan | June 25, 1957 |
| 2,797,068 | McFarlan | June 25, 1957 |
| 2,935,857 | McFarlan | May 10, 1960 |